United States Patent [19]

Ravier

[11] Patent Number: 5,531,367
[45] Date of Patent: Jul. 2, 1996

[54] VEHICLE BAGGAGE-HOLDER DEVICE

[75] Inventor: Jean-Marie Ravier, Saint Malo, France

[73] Assignee: Automaxi Industries, Saint Malo, France

[21] Appl. No.: 382,065

[22] Filed: Feb. 1, 1995

[30] Foreign Application Priority Data

Feb. 10, 1994 [FR] France .................. 94 01497

[51] Int. Cl.⁶ .................................................. B60R 9/058
[52] U.S. Cl. ................... 224/329.000; 224/309; 224/320; 224/321
[58] Field of Search .................. 224/309, 314, 224/320, 321, 326, 327, 329, 330, 319, 331, 488

[56] References Cited

U.S. PATENT DOCUMENTS

| | | |
|---|---|---|
| 2,641,396 | 6/1953 | Parr .................. 224/320 |
| 3,858,774 | 1/1975 | Friis .................. 224/329 |
| 4,265,382 | 5/1981 | Edwards .................. 224/320 |
| 4,483,471 | 11/1984 | Prosen . |
| 4,489,868 | 12/1984 | Thirion .................. 224/321 |
| 4,601,419 | 7/1986 | Bird .................. 224/327 |
| 4,778,092 | 10/1988 | Grace .................. 224/314 |
| 5,118,020 | 6/1992 | Piretti . |

FOREIGN PATENT DOCUMENTS

| | | |
|---|---|---|
| 0360706 | 3/1990 | European Pat. Off. . |
| 1237841 | 6/1960 | France . |
| 1184229 | 12/1964 | Germany . |
| 504573 | 12/1954 | Italy .................. 224/314 |
| 104715 | 6/1942 | Sweden .................. 224/326 |
| 9209454 | 6/1992 | WIPO .................. 224/314 |

Primary Examiner—Henry J. Recla
Assistant Examiner—Gregory M. Vidovich
Attorney, Agent, or Firm—Bachman & Lapointe

[57] ABSTRACT

The baggage-holder of the invention includes a frame which has lateral bars made from bent extruded U-section and transverse bars made from hollow tubes. The U-section has a longitudinal slot. Support members are provided which are separate from the members for attachment to the bodywork. The various members and the hollow tubes include immobilizing devices sliding in the slot. This enables fixing of the support members and fixing members anywhere along the lateral parts. The ends of the U-section slide inside the hollow tubes enabling adjustment of the width of the frame. The baggage-holder can also include a hoop mobile about a transverse axis.

8 Claims, 3 Drawing Sheets

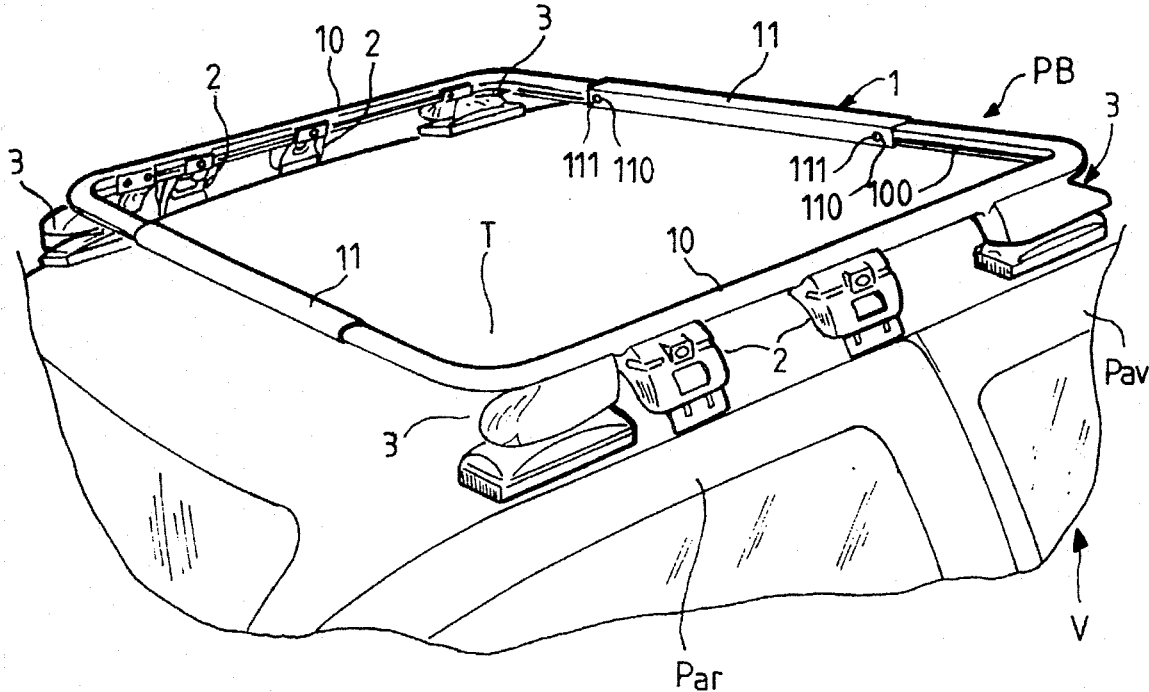
FIG_1
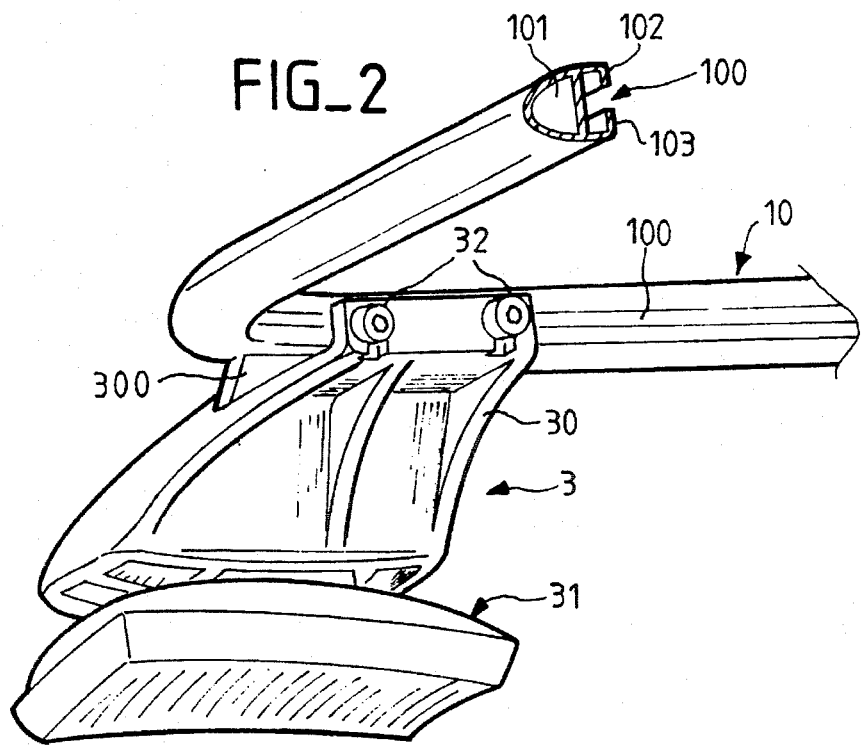
FIG_2

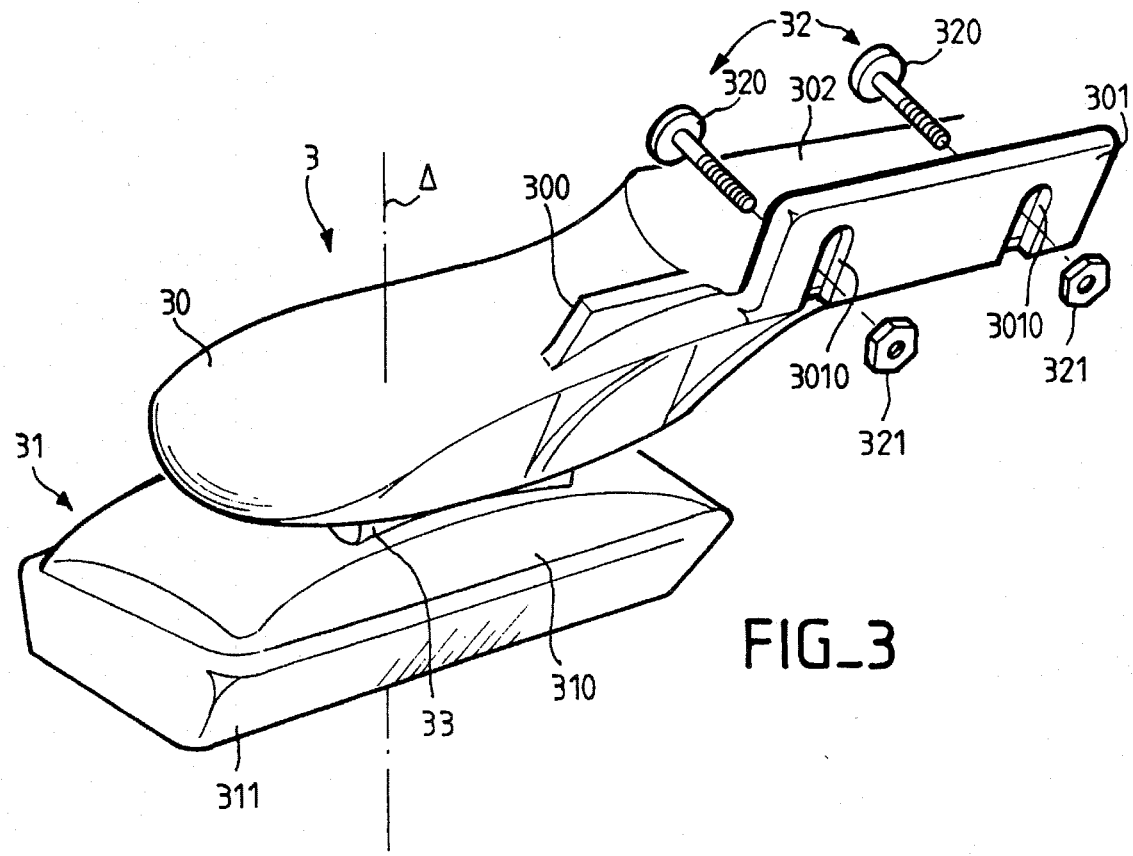
FIG_3
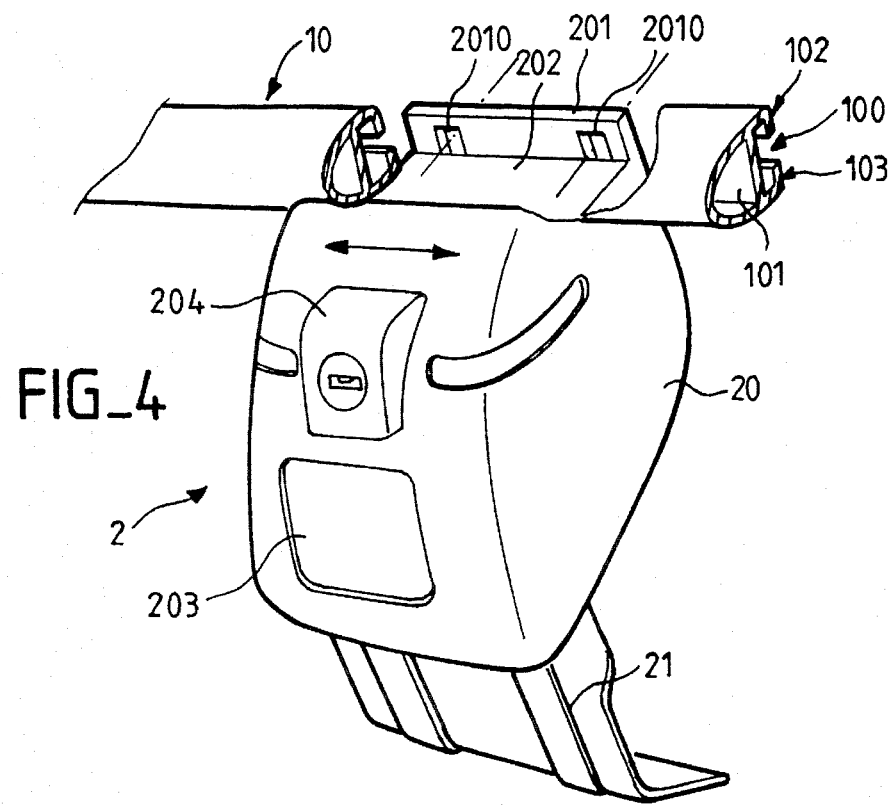
FIG_4

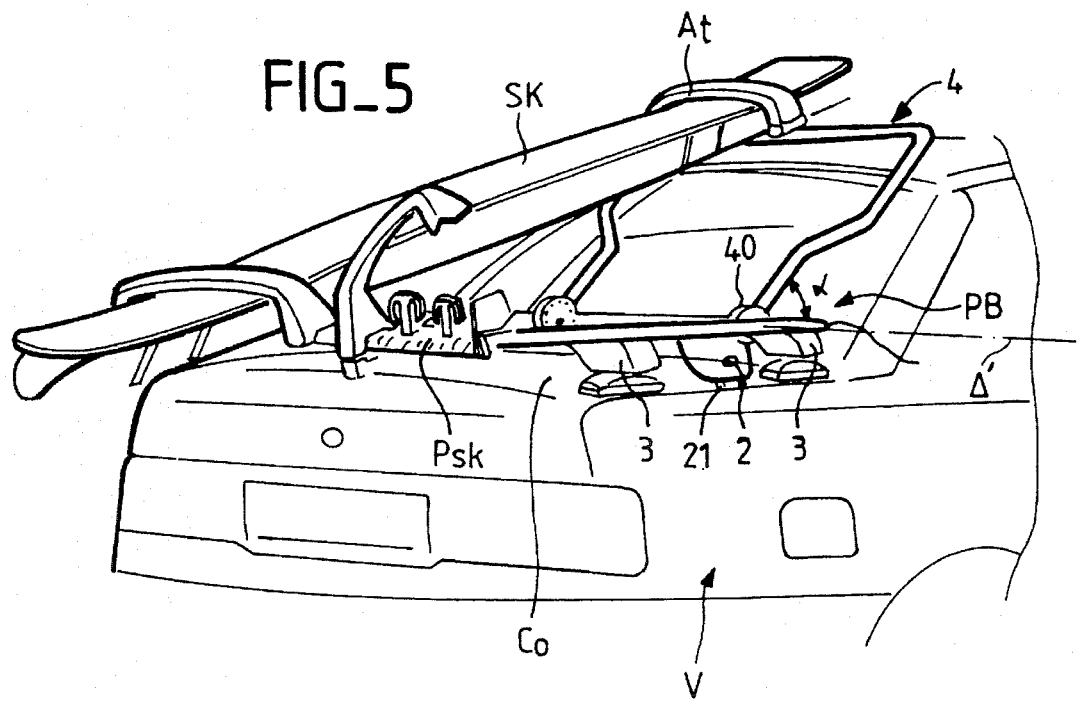
FIG_5
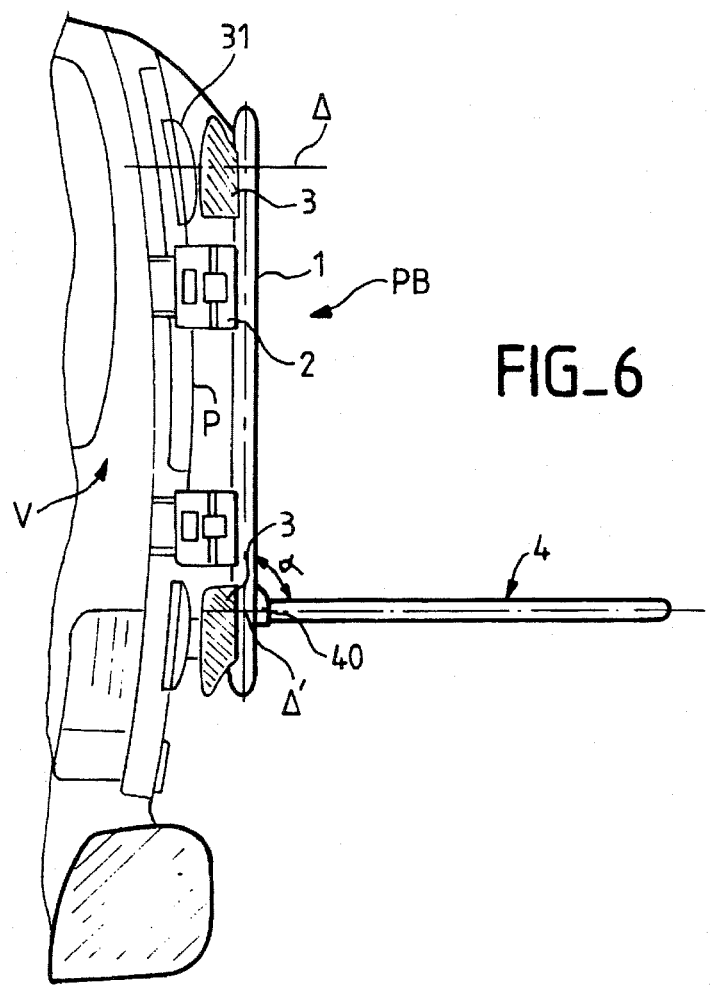
FIG_6

VEHICLE BAGGAGE-HOLDER DEVICE

BACKGROUND OF THE INVENTION

1. Field of the Invention

The present invention concerns a multipurpose baggage-holder device for vehicles.

2. Description of the Prior Art

There are many kinds of baggage-holder. The most common comprise a pair of transverse bars fixed to the roof of an automobile to which baggage is attached by means of straps or like members. Fixing means allowing the baggage-holder to be removed usually provide supports for the baggage-holder or at least are in the immediate proximity of the supports. Other types of baggage-holder are in the form of a flat deck or container also fixed to the roof of a vehicle.

These types of baggage-holder are not suitable for attaching to the hatchback or to the rear door of a vehicle.

Baggage-holders specifically intended for this purpose are then used. German patent DE-C-4 134 715 describes a baggage-holder adapted to be fixed to the rear door or hatchback of an automobile vehicle, in particular a minibus, a camper van or another similar vehicle.

Even in the case of baggage-holders intended to be mounted only on the roof, problems arise with many vehicles.

First of all, modern vehicles do not usually have a gutter. The fixing meters which forms supports must incorporate attachment members adapted to be inserted into the gap between the top of the door and the body shell. This imposes a first constraint on the location of these attachment members, even when there is considerable latitude in such positioning.

Many vehicles have a highly curved roof. This severely reduces the choice of attachment points. It may be necessary to have the attachment points less than 0.50 m apart to accomodate the curvature of the roof, which significantly restricts load-carrying capacity.

The roof of modern vehicles is usually rigid only in small areas located along the edges. To prevent a heavy load deforming the metal of the roof the supports must therefore bear only on these areas.

Some types of vehicle, such as cabriolet vehicles, require baggage-holders to be attached to a part of the bodywork other than the roof. The baggage-holder is therefore fitted to the trunk lid, which raises problems of its own.

The situation as outlined above explains why there are so many different types and constructions of baggage-holder, whether for specific uses: trunk lid rack, roof rack, etc, or for vehicles of specific make and model.

The invention is directed to alleviating the drawbacks of prior art baggage-holders by proposing a general purpose baggage-holder which can be mounted in various areas: roof, rear door, hatchback or trunk lid; on the same vehicle or different vehicles: sedan, station wagon, cabriolet, minibus, camper van, etc, without requiring any unusual adaptation. Also, as described in more detail below, the structure of the baggage-holder of the invention is simple, so that it is easily manufactured at low cost.

SUMMARY OF THE INVENTION

To achieve the stated object the invention provides firstly for dissociating the supports from the fixing members, whether they are at the front or at the rear of the baggage-holder. The main framework of the baggage-holder of the invention comprises a frame along which the fixing members and support members slide. This enables these members to be located anywhere along the roof or, more generally, along the appropriate part of the bodywork.

In a preferred embodiment of the invention the frame comprises two lateral bars made from an extruded section linked by two transverse bars enabling adjustment of the width of the main frame.

In a preferred embodiment of the invention the support members each comprise an oscillating shoe mounted on a ball-joint for optimum matching to the shape of the roof in the area on which the shoe rests.

Finally, the baggage-holder of the invention is advantageously provided with a folding hoop rotating about a transverse axis.

The invention thus consists in a baggage-holder device for vehicles comprising a frame having two lateral bars and at least two transverse bars, detachable means for attaching the frame to the bodywork of the vehicle, and, associated with each lateral bar, at least two support members for supporting the frame and resting on a particular area of the bodywork of the vehicle, wherein the support members are separate from the attachment members and have a main body on which the frame rests and support means having an elastic material shoe adapted to be in contact with the area of the bodywork of the vehicle, and the main body and the support means of the support member are mechanically coupled by means of a ball-joint to allow oscillation to a particular maximal amplitude of the support means about an axis substantially perpendicular to the plane of the frame.

The invention will be more clearly understood and other features and advantages of the invention will emerge from a reading of the following description given with reference to the appended drawings in which:

BRIEF DESCRIPTION OF THE DRAWINGS

FIG. 1 is an overall view showing the use of the baggage-holder of the invention as a vehicle roof rack.

FIG. 2 is a detailed view showing the fixing of a support member to the frame of the baggage-holder of the invention.

FIG. 3 shows in detail one embodiment of a support member in a preferred embodiment of the baggage-holder of the invention.

FIG. 4 shows in detail one embodiment of a fixing member for the frame of a baggage-holder of the invention.

FIG. 5 shows the use of a baggage-holder of the invention as a vehicle trunk lid rack.

FIG. 6 shows the use of a baggage-holder of the invention as a vehicle rear door rack.

DETAILED DESCRIPTION OF THE INVENTION

FIG. 1 is an overall view showing the use of the baggage-holder PB of the invention as a roof rack, the most usual use for this type of device. This figure shows the essential features of the baggage-holder of the invention, and these are described in more detail below. The baggage-holder PB has a tubular frame 1 which is substantially rectangular. In a preferred embodiment of the invention the frame 1 includes two lateral bars 10 made from two U-section extrusions and two transverse bars 11 made from hollow tube.

As shown in more detail in FIG. 2, in this preferred embodiment of the invention each section 10 has a longitudinal slot 100 opening towards the interior side of the U-section, i.e. towards the inside of the frame in the example shown. This slot 100 and the adjacent edges 102 and 103 form guide rails for immobilizing means described in more detail below. The internal structure of the section is advantageously reinforced to increase the stiffness of the frame. It can be provided with an internal rib or partition 101, as shown in FIG. 2.

The slot 100 has a double function.

Firstly, the ends of the U-section slide inside the tubes 11. Near their ends the latter incorporate means for immobilizing the bars 10. In the conventional way, a hole 110 can be provided at each end to receive nut and bolt fasteners 111. This arrangement makes it a simple matter to adjust the width of the frame 1. All that is required is to insert the bars 10 sufficiently far into the tubes 11 and then to lock them in the required position using the aforementioned locking means 110 and 111.

Secondly, support members 3 and fixing members 2 for fixing the frame to the bodywork of the vehicle V are attached to the bars 10. One important feature of the invention is that these two functions are dissociated.

Each of these members is advantageously fixed to the frame in a manner analogous to that just described for immobilizing the bars 10 in the tubes 11. Nuts and bolts 32 are also used for this purpose (FIG. 2). FIG. 2 shows a support member 3. The member 3 can be slid all the way along the section 10 if the slot 100 runs along all of its length, as shown in the figure. There may be embodiments in which the slot runs along only part of the length of the U-section. If the bar 10 is made from an extruded section, the slot is formed during the extrusion process and therefore runs along all of the length of the section. The fixing members 2, which are not shown in FIG. 2, are attached to the section 10 in an entirely similar manner. It follows that they can also slide all the way along the section 10. In this way it is an extremely simple matter to adjust the position of both these members to locate them optimally on the surface of the roof.

In the usual way, each of the lateral bars 10 of the frame 1 has at least two support members 3, one at the front and the other at the rear of the roof of the vehicle V. One or two fixing members 2 are used. Although in theory one fixing member is sufficient in most applications, the configuration shown would seem best suited to correct attachment of the frame to the roof of the vehicle. Also, for heavy loads and in particular in the case of long vehicles it may be beneficial to increase the number of fixing members 2 and possibly of support members 3. The exact position of the members 2 and 3 naturally depends on the make and model of the vehicle concerned. One advantage of the device of the invention is that the position of these members is easily adjustable. In the example shown in FIG. 1 the support members are right at the front and right at the rear of the frame, which is a configuration very often used. The two fixing members 2 have been positioned with one in the middle part of the frame 1 and the other towards the rear of the frame. In the known manner the fixing members 2 are provided with attachment members (described below with reference to FIG. 4) which are slipped into the gap between the top of the doors and the bottom edge of the roof. In the example shown, which is not limiting in any way on the scope of the invention, both attachment members are slipped into the gap between the top of the rear door Par and the roof T of the vehicle V. In another configuration the attachment member at the front could equally well be located above the front door Pav.

FIG. 3 shows a preferred embodiment of the support member 3. It has a main body 30 mechanically coupled to a shoe 31. The latter has a rigid upper body 310 and a sole 311 which bears on the bodywork of the vehicle. The sole 311 is advantageously made from an elastic material to absorb compression forces when the frame is fixed to the vehicle bodywork and to eliminate any risk of scratching or damage to the surface of the bodywork in contact with the shoe 311. This feature is naturally well known in itself. In the preferred embodiment of the invention the mechanical coupling between the main body 30 at the top and the shoe 31 at the bottom is, rather than being rigid, effected by means of a ball-joint 33 or some similar member nested in the main body. By this means the shoes 31 can oscillate about an axis Δ (FIG. 3) substantially perpendicular to the plane defined by the frame 1 (FIG. 1). The maximum inclination of the shoe relative to this axis Δ is set during manufacture according to the intended use of a given type of baggage-holder PB. It depends mainly on the relative shapes of the body 30, the ball-joint 33 and the shoe 31.

This advantageous arrangement overcomes most of the problems associated with the curvature of the roof T of the vehicle V in the area on which the support member 3 rests.

The main body has an upper area 302 which is slightly curved in the example shown. This area 302 forms a platform and is adapted to support the section 10, and its exact configuration therefore depends on the external shape of the section 10. The main body also has a wall 301 on which the slotted side of the section 10 bears. This wall 301 has holes 3010 for screws 320 whose head is trapped (in the example shown) by the guide rail formed by the lips 102 and 103 of the slot 100 in the section 10 (FIG. 1). Nuts 321 clamp this wall 301 against the facing wall of the section 10 and therefore immobilize the support member 3 at an appropriate location along the section 10.

The body 30 usually has a rounded profile and can advantageously have in its upper part a thin support rib 300 extending the area forming the platform 302. The lower side of the section 10 bears on this rib 300.

FIG. 4 shows one embodiment of a fixing member 2. It has a main body 20 extended downwardly by an attachment member 21 of a type that is known in itself. As previously mentioned, this member forms a hook adapted to be inserted into the gap between the edge of a door and the bodywork. This rigid member 21 is usually made from steel and is therefore thin. It is mobile relative to the main body 20. A screw system 203 retracts it so that it applies a traction force to the frame 1, to be more precise to the section 10 with which it is associated. The assembly can be completed with a lock 204 to prevent theft. This arrangement is also known in itself.

Similarly to the support member, it has an area 202 forming a platform for the section 10 and a wall 201 on which the slotted side of the section 10 bears. This wall 201 has holes 2010 for screws (not shown) in exactly the same way as already described for the support member 3. Adjustment along and immobilization on the member 10 are effected in exactly the same way and there is no point in describing this again.

It is to be understood that the concepts of "top" and "bottom" as used in the foregoing description are relative concepts used for convenience of description. As made clear below, the frame 1 of the baggage-holder PB of the invention can assume any position in space, not only the usual substantially horizontal position of a roof rack.

FIGS. 5 and 6 show two of many other uses of the baggage-holder PB of the invention.

FIG. 5 shows the possibility of attaching the baggage-holder PB of the invention to the trunk lid Co of a vehicle V. The trunk lid Co takes the place of the vehicle door in so far as the attachment function is concerned. The attachment member 21 of the fixing member 2 is slipped into the gap between the trunk lid Co and the surrounding bodywork. The example shown uses only one attachment member 2 on each side, substantially halfway between the two support members 3.

FIG. 5 shows an additional feature of the baggage-holder PB of the invention. It can advantageously be provided with a hoop 4 rotating about a transverse axis Δ' parallel to the plane of the frame 1. In the embodiment shown in FIG. 5 a conventional ratchet system 40 is used to adjust the position of the hoop 4, i.e. its inclination α relative to the frame 1. This feature is particularly beneficial when the baggage-holder is used as a trunk lid rack. It enables long objects such as skis, surfboards or the like to be carried on the baggage-holder PB when their dimensions would otherwise be incompatible with the length of the trunk and in particular with the presence of the rear window of the vehicle V.

In the example shown in FIG. 5 a conventional ski rack Psk of any appropriate type has been fixed to the rear of the baggage-holder. One end of a pair of skis SK is attached by means of the ski rack Psk with the other end resting on the hoop 4. An attachment At, also of a conventional type, is fitted to the hoop 4.

FIG. 6 shows the use of baggage-holder PB of the invention on the rear door P of a minibus, camper van or similar vehicle V. In this case the plane of the frame 1 is substantially vertical. The diagram also shows that because the shoe 31 can rotate about the axis Δ it adapts perfectly to the accentuated curvature above the door.

This figure also shows an alternative embodiment of the mechanism 40 enabling the hoop 4 to rotate about the axis Δ'. In this embodiment the hoop can assume only two stable positions: a deployed position (shown in the figure) in which the angle α to which the hoop 4 is opened is substantially equal to 90°, in this embodiment, and a folded position (not shown) in which this angle is substantially zero. All that is required is to provide the mechanism 40 in the conventional way with a rotation axis parallel to Δ' and an abutment limiting the maximum opening angle to the required value. This specific, "simplified" embodiment can be beneficial if the baggage-holder PB is used only as a rear door rack. In this application the hoop 4 essentially provides a support platform for objects attached to the baggage-holder PB and a single, substantially horizontal open position is sufficient in nearly all cases.

Although the facilities offered by the baggage-holder PB of the invention have not been described exhaustively, the three main applications shown in FIGS. 1, 5 and 6 clearly indicate that the baggage-holder is suitable for use in many configurations. Regardless of the position at which it is attached to the bodywork and/or of the type of vehicle, only a few simple adjustments are needed, the baggage-holder PB having a very simple structure. It is also well-suited to mass production. In the preferred embodiment the frame, in particular, is made from simple extruded sections (lateral bars) cut to length and bent to shape and conventional hollow tubes (transverse bars). The other components differ little from the components used on prior art baggage-holders, especially the fixing members 2. The usual production techniques employed in this art can therefore be used.

The baggage-holder PB as described achieves the objects of the invention as stated.

The following numerical example of typical technical specifications for the baggage-holder PB is provided by way of illustration only:

length of transverse bars 11: 600 mm;

material of transverse bars: steel;

lateral bars 10:
　width of "U": 600 mm;
　height of "U": 300 mm;
　material: extruded aluminum;

widthwise adjustment of frame 1: 300 mm;

length of folding hoop 4 (if fitted): 600 mm approx.;

ratchet mechanism 40: adjusts angle α in increments of 15°;

fixing member: conventional type, made from steel;

support member: main body 30 and shoe 310 made from plastics material, for example polycarbonate; sole of shoe 311 in evoprene; ball-joint 32 in composite material.

It is to be understood that the invention is not limited to the embodiments previously described, in particular with reference to FIGS. 1 through 6. In particular, the geometrical dimensions and materials mentioned above are not limiting in any way on the scope of the invention, being merely examples.

In particular, although the structure of the frame using two U-sections and two straight hollow tubes is particularly advantageous, because of its ease of manufacture, in an alternative embodiment (not shown) for particular applications additional transverse members can be provided, in particular for baggage-holders of large size. The frame 1 then has a more complex structure, of course. The frame shown, in FIG. 1 in particular, can constitute a module. The baggage-holder PB is then assembled from one or more modules. All that is required to allow this is to modify slightly at least one of the transverse bars 11 so that the ends of two sections 10 can be inserted into it. The associated immobilizing means (110, 111 in FIG. 1) are duplicated.

The number of support members 3 and the number of attachment members 2 can be varied to suit the particular type of baggage-holder and its intended use, as described.

There is claimed:

1. Baggage-holder device for vehicles comprising:

a frame having two lateral bars and two transverse bars connected to said lateral bars;

detachable means for attaching said frame to the bodywork of said vehicle;

at least two support members associated with each said lateral bar for supporting said frame and resting on a particular area of said bodywork of said vehicle;

said support members being separate from said detachable means and each having a main body on which said frame rests and support means having an elastic material shoe adapted to be in contact with said area of said bodywork of said vehicle;

said main body and said support means of each of said support members being mechanically coupled by means of a ball-joint to allow oscillation in three dimensions about an axis substantially perpendicular to a plane of said frame;

each of said transverse bars being made from a tube;

said lateral bars each having ends joined to respective ends of said tubes;

each of said lateral bars having a guide rail;

said support means and said detachable means each having immobilizing means; and said immobilizing means forming with said guide rail a mutual mechanical coupling means for enabling said support members and said detachable means to adjustably slide along said guide rail and to be immobilized in adjustable positions, and said tubes forming the transverse bars having means for immobilizing the lateral bars to allow adjustment of a transverse dimension of said frame.

2. Baggage-holder device according to claim 1 wherein said frame has a hoop connected thereto and moveable about an axis relative to an a plane defined by said frame and adapted to be moveable between at least a closed first position adjacent said frame and a deployed second position in which the hoop is at a predetermined maximal angle with respect to said frame.

3. Baggage-holder device according to claim 2 further comprising a ratchet mechanism for adjusting the angle between said hoop and said frame in regular increments between said closed position and said deployed position.

4. Baggage-holder device according to claim 1 wherein said predetermined area of said bodywork of said vehicle is the roof.

5. Baggage-holder device according to claim 1 wherein said predetermined area of said bodywork of said vehicle is the trunk lid.

6. Baggage-holder device according to claim 1 wherein said vehicle comprises a minibus and said predetermined area of said bodywork of said vehicle is a rear door.

7. Baggage-holder device for vehicles comprising:

a frame having two lateral bars and two transverse bars connected to said lateral bars;

detachable means for attaching said frame to the bodywork of said vehicle;

at least two support members associated with each lateral bar for supporting said frame and resting on a particular area of said bodywork of said vehicle;

said support members being Separate from said detachable means and each having a main body on which said frame rests and support means having an elastic material shoe adapted to be in contact with said area of said bodywork of said vehicle;

said main body and said support means of each of said support members being mechanically coupled by means of a ball-joint to allow oscillation in three dimensions about an axis substantially perpendicular to a plane of said frame;

each of said transverse bars being made from a straight hollow tube;

said lateral bars comprising two U-section lateral bars each having ends which are adjustably received within respective ends of said hollow tubes;

each of said lateral bars having a guide rail;

said guide rail facing towards the inside of said U-section;

said support members and said detachable means each having immobilizing means; and said immobilizing means forming with said guide rail a mutual mechanical coupling means for enabling said support members and said detachable means to adjustably slide along said guide rail and to be immobilized in adjustable positions, and said hollow tubes forming the transverse bars have means for immobilizing the lateral bars threaded into the hollow tubes to allow adjustment of a transverse dimension of said frame.

8. Baggage-holder device according to claim 7 wherein said lateral bars are each made from a bent extruded section and each said guide rail comprises a longitudinal slot in said section and the lips adjacent said slot.

* * * * *